(12) United States Patent
Merrick (10) Patent No.: US 11,609,212 B2
(45) Date of Patent: Mar. 21, 2023

(54) CHROMATOGRAPHY SYSTEM

(71) Applicant: LECO Corporation, St. Joseph, MI (US)

(72) Inventor: Mark Firmer Merrick, Bridgman, MI (US)

(73) Assignee: LECO Corporation, St. Joseph, MI (US)

( * ) Notice: Subject to any disclaimer, the term of this patent is extended or adjusted under 35 U.S.C. 154(b) by 0 days.

(21) Appl. No.: 17/809,330

(22) Filed: Jun. 28, 2022

(65) Prior Publication Data

US 2022/0326196 A1  Oct. 13, 2022

Related U.S. Application Data (63) Continuation of application No. 16/441,603, filed as application No. PCT/US2017/066221 on Dec. 13, 2017, now Pat. No. 11,391,706.

(Continued)

(51) Int. Cl.
*G01N 30/30* (2006.01)
*G01N 30/12* (2006.01)
*G01N 30/46* (2006.01)
*G01N 30/54* (2006.01)
*G01N 30/02* (2006.01)

(52) U.S. Cl.
CPC ............ *G01N 30/30* (2013.01); *G01N 30/12* (2013.01); *G01N 30/463* (2013.01); *G01N 30/54* (2013.01); *G01N 2030/025* (2013.01); *G01N 2030/122* (2013.01)

(58) Field of Classification Search
None
See application file for complete search history.

(56) References Cited

U.S. PATENT DOCUMENTS

| 4,919,893 A | 4/1990 | Bandurski et al. |
| 5,135,549 A | 8/1992 | Phillips et al. |

(Continued)

FOREIGN PATENT DOCUMENTS

| JP | 2005-521062 A | 7/2005 |
| JP | 2007-527013 A | 9/2007 |

(Continued)

OTHER PUBLICATIONS

International Search Report dated Mar. 30, 2018, relating to International Application No. PCT/2017/066221.

(Continued)

*Primary Examiner* — Daniel S Larkin
(74) *Attorney, Agent, or Firm* — Honigman LLP (57) ABSTRACT

A method for applying a heating sequence for a modulator includes, during a first period of time, heating a first heating zone disposed along a length of the modulator without heating a second heating zone to cause a sample trapped from a first transfer line at an entrance of the modulator to move from the first heating zone to the second heating zone. The method also includes, during a second time period, withdrawing the heating of the first heating zone to prevent the sample from entering the modulator from the first transfer line. During a third time period, the method includes heating the second heating zone without heating the first heating zone to reinject the sample into a second transfer line.

15 Claims, 7 Drawing Sheets

Related U.S. Application Data (60) Provisional application No. 62/434,916, filed on Dec. 15, 2016.

(56) References Cited

U.S. PATENT DOCUMENTS

| | | | |
|---|---|---|---|
| 5,196,039 | A | 3/1993 | Phillips et al. |
| 5,205,154 | A | 4/1993 | Lee et al. |
| 5,288,310 | A | 2/1994 | Peters et al. |
| 6,617,551 | B2 | 9/2003 | Karube et al. |
| 6,838,288 | B2* | 1/2005 | Beens ............... G01N 30/465 422/89 |
| 7,306,656 | B2* | 12/2007 | Lange ............... G01N 30/12 95/87 |
| 7,513,936 | B2 | 4/2009 | Roques |
| 9,067,167 | B2 | 6/2015 | Mondello |
| 2003/0037592 | A1 | 2/2003 | D'Couto et al. |
| 2005/0139076 | A1 | 6/2005 | Ledford, Jr. |
| 2005/0247104 | A1 | 11/2005 | Hasselbrink et al. |
| 2011/0088452 | A1 | 4/2011 | Kim et al. |
| 2011/0143952 | A1 | 6/2011 | Lewis et al. |
| 2011/0232366 | A1 | 9/2011 | Guan et al. |
| 2013/0055791 | A1 | 3/2013 | Sotomaru et al. |
| 2021/0356441 | A1* | 11/2021 | Stallone ............... G01N 30/30 |

FOREIGN PATENT DOCUMENTS

| | | |
|---|---|---|
| JP | 2010-271241 A | 12/2010 |
| JP | 2015-184103 A | 10/2015 |
| WO | WO-1998021574 A1 | 5/1998 |
| WO | WO-2011004404 A1 | 1/2011 |
| WO | WO-2011099079 A1 | 8/2011 |

OTHER PUBLICATIONS

First Office Action by the Japanese Patent Office dated Jun. 23, 2020, relating to Japance Application No. 2019-527505 (with translation).

German Patent Office, Office Action relating to Application No. 112017006319.1 dated Jan. 20, 2022.

U.S. Patent and Trademark Office, Office Action for U.S. Appl. No. 16/441,603 dated Dec. 16, 2021.

"Thermal modulator array for analyte modulation and comprehensive two-dimensional gas chromotography", Ben Burger, Tertia Snyman, Wina J.G. Burger, Willie F. vanRooyen, Journal of Separation Science 2003, 26, 123-138.

* cited by examiner

CHROMATOGRAPHY SYSTEM

CROSS-REFERENCE TO RELATED APPLICATION

This application is a continuation of, and claims priority under 35 U.S.C. § 120 from, U.S. patent application Ser. No. 16/441,603, filed on Jun. 14, 2019, now U.S. Pat. No. 11,391,706, which claims priority to PCT Application No. PCT/US2017/066221, filed on Dec. 13, 2017, which claims priority under 35 U.S.C. § 119(e) to Provisional U.S. Patent Application No. 62/434,916, filed on Dec. 15, 2016. The disclosures of these prior applications are considered part of the disclosure of this application and are hereby incorporated by reference in their entireties.

TECHNICAL FIELD

This disclosure relates to a chromatography system.

BACKGROUND

Existing chromatography systems and methods perform adequately for their intended purpose. However, improvements to such systems and methods are continuously being sought in order to advance the arts.

SUMMARY

One aspect of the disclosure provides a chromatography system including a modulator, a chromatograph, a cooler and a detector. The chromatograph is connected to the modulator by a first heated transfer line. The detector is connected to the modulator by a second heated transfer line. The cooler is connected to the modulator and the modulator is arranged outside of the chromatograph.

Implementations of the disclosure may include one or more of the following optional features. In some implementations, the modulator may be provided together with a secondary oven, where the modulator is connected to the first heated transfer line. The secondary oven is connected to the second heated transfer line.

In some implementations, the gas chromatography system includes a heat pipe or a thermosiphon system that connects the modulator with the cooler. The heat pipe or the thermosiphon system is configured to remove heat from the modulator. Alternatively, in other implementations, the cooler is disposed on the modulator.

In some examples, the secondary oven includes a cylindrical shape. Additionally, the secondary oven may include a cylindrical ceramic heater.

In some implementations, the modulator includes a heater and a capillary column defining a void. The capillary column arranged in the void of the heater.

In some examples, the modulator is connected to the heat pipe or a thermosiphon system, and the heater is in direct contact with the heat pipe or the thermosiphon system. In some examples, the heater may be disposed on a surface of the capillary column. While, in other examples, the heater defines a heater thickness having the surface disposed on the capillary column. In this case, the heater includes a heating element disposed on the surface of the heater or within a threshold distance from the surface of the heater.

In some examples, the capillary column may be in direct contact with the heater. The heater may be a ceramic heater. In some examples, the chromatography system further includes insulation disposed upon the heater. The insulation may be layered. Additionally or alternatively, the insulation may be a vacuum insulated covering.

The heater may include a thermal conducting material. In some implementations, the thermal conducting material is aluminum nitride. The heater may include a temperature sensor. In some examples, the heater includes two or more stages.

In some examples, the modulator defines a first heating zone and a second heating zone adjacent to the first heating zone. At a first period of time, the first and second heating zones are not heated. For example, at the first period of time, the first and second heating zones may be cooled. At a second period of time following the first period of time, the first heating zone is heated causing samples to pass from a capillary column within the heated transfer line to the capillary column within the second heating zone passing through the first heating zone. At a third period of time following the second period of time, the first heating zone is not heated preventing samples from passing from the capillary column within the heated transfer line to the capillary column within the second heating zone. For example, at the third period of time, the first heating zone may be cooled. Finally, at a fourth period of time following the third period of time, the second heating zone is heated causing samples to pass from the capillary column within the second heating zone to the capillary column within the secondary oven.

In some implementations, the first heated line is configured to transfer a sample from the chromatograph to the modulator. The second heated line is configured to transfer the sample from the modulator to the detector through the second heated transfer line. In some implementations, the first transfer line transfers a sample to the modulator. The modulator receives the sample and transfers the sample to the secondary oven, which in turn transfers the sample to the second transfer line.

In some examples, the cooler is a Stirling cooler. In addition, the heat pipe or the thermosiphon system removes heat from the modulator, more specifically the modulator.

In some implementations, the chromatography system includes a secondary oven. The modulator is positioned within the secondary oven. The secondary oven is connected to the first heated transfer line and the second heated transfer line.

In some examples, the chromatograph is a gas chromatograph. In other examples, the chromatograph a two-dimensional gas chromatograph.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

This disclosure describes an exemplary system having a chromatograph and a modulator, and more specifically a comprehensive two-dimensional gas chromatography ("GCxGC") system with a thermal modulator. In some implementations, a two-dimensional gas chromatography system includes a thermal modulator that: (1) produces sufficiently narrow reinjection bands for optimum comprehensive two-dimensional gas chromatography, (2) provides fast modulation, (3) may require only electricity for operation, (4) operates with standard capillary gas chromatographic columns ("capillary GC columns"), and (5) allows easy installation of the standard capillary GC column.

Figure 1:
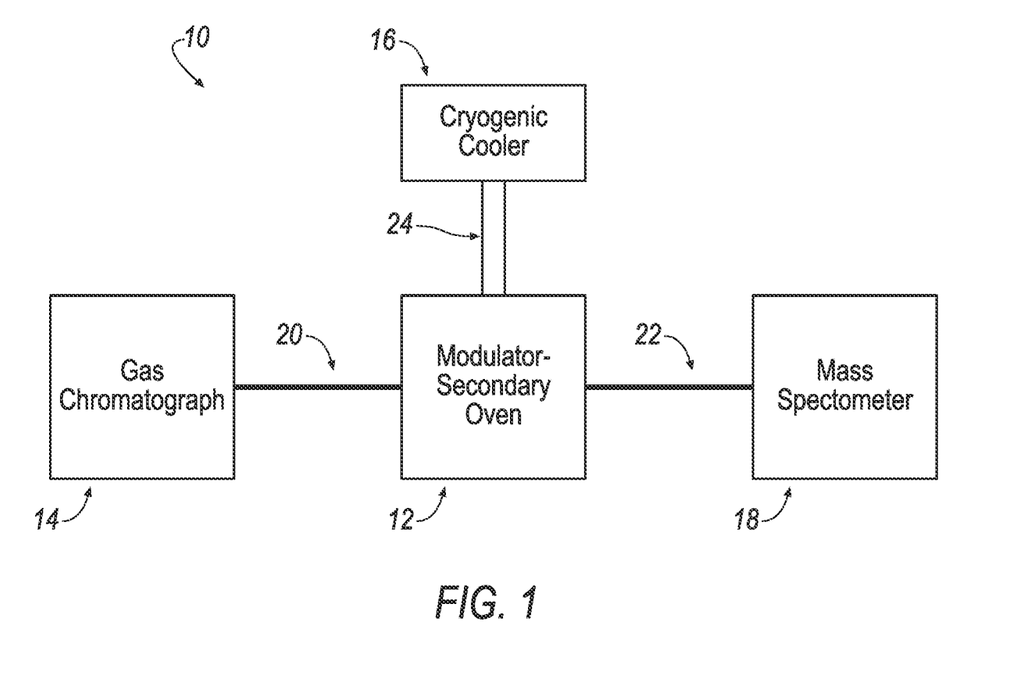
FIG. 1 is a schematic view of an exemplary gas chromatography system.

FIG. 1 shows, a block diagram of an exemplary system 10. The system 10 includes a modulator-secondary oven 12, a chromatograph, such as a gas chromatograph ("GC") 14, a cooler 16 (e.g., a cryogenic cooler or other types of coolers), and a detector 18. A first heated transfer line 20 connects the modulator-secondary oven 12 to the GC 14. A second heated transfer line 22 connects the modulator-secondary oven 12 to the detector 18. A heat pipe or a thermosiphon system 24 connects the modulator-secondary oven 12 to the cooler 16. As will be explained in more detail below, the configuration of the system 10 may allow for successful trapping of volatile compounds at higher temperatures than would otherwise be possible.

While a modulator-secondary oven assembly 12 is described as a preferred embodiment, it is to be understood by the ordinary artisan that the secondary oven 12 may be omitted such that a secondary oven should not be read into the claims unless express reference is made therein to a secondary oven. For brevity, however, the remainder of the disclosure refers to a modulator-secondary oven assembly 12.

With continued reference now to FIG. 1, in an implementation, a modulator-secondary oven assembly 12 is arranged outside of the gas chromatograph 14. As shown, modulator-secondary oven assembly 12 is arranged between the GC 14 and the mass spectrometer 18. In some examples, the modulator-secondary oven assembly 12 is positioned on top of the GC 14 in a substantially similar manner to a valve oven.

In an implementation, a sample (not shown) is transferred through the first heated transfer line 20 from the gas chromatograph 14 to the modulator-secondary oven 12. The sample may be further transferred from the modulator-secondary oven 12 to the detector 18 (or other external gas chromatographic detectors, not shown) through the second heated transfer line 22.

In a preferred embodiment, an arrangement of the modulator-secondary oven 12 outside of the gas chromatograph 14, as opposed to the current designs where the modulator is positioned inside the GC oven, provides several advantages. Some of the advantages may include, but are not limited to: (1) temperatures of the modulator-secondary oven 12 below the temperature of the GC oven are more easily achieved and controlled, (2) temperatures of the modulator-secondary oven 12 are more easily and better controlled outside of the turbulent air flow within the GC oven, (3) the position of the modulator-secondary oven 12 outside of the GC oven frees up space in the GC oven (that is already relatively small), and does not disturb air flow and temperature within the GC oven, and (4) the modulator-secondary oven 12 may be positioned relatively closer to the detector 18 with a relatively shorter second heated transfer line 22, which may benefit fast chromatography in the second dimension.

Figure 2:
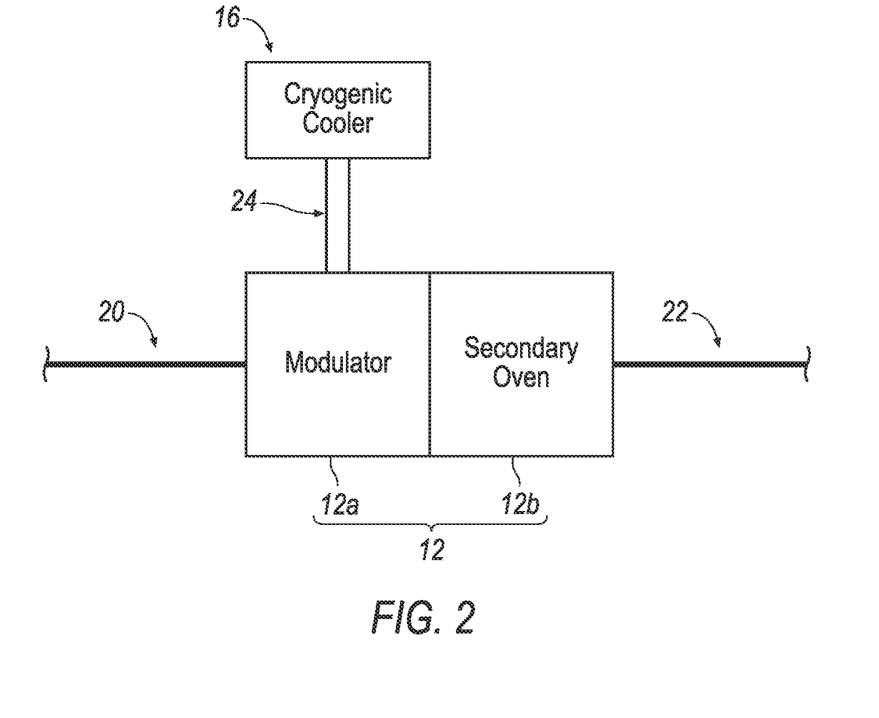
FIG. 2 is a schematic view of an exemplary modulator-secondary oven of the gas chromatography system of FIG. 1.

The cooler 16 may be a cryogenic cooler, which produces narrower reinjection bands. Additionally, the cryogenic cooler 16 may be a Stirling cooler in order to reach cryogenic temperatures. In implementations, a Stirling cooler usually includes (from a first end to a second end) a piston, a compression space, and heat exchanger (all at an ambient temperature), a regenerator, and a heat exchanger, expansion space, and a piston (all at a lower temperature). Referring to FIG. 2, the heat pipe or the thermosiphon system 24 is situated to remove heat from the modulator 12a to the cooler 16 such that the cooler 16 does not have to be connected directly to the modulator 12a. However, in some implementations, the cooler 16 may be connected directly to modulator 12a (not shown). Other coolers 16, such as, but not limited to low-temperature refrigeration and thermoelectric coolers may be implemented with different modulator designs to address the temperature differences of the coolers 16. In general, cryogenic temperatures (~−150° C. and colder) provide better modulation (i.e. narrower reinjection bands) presumably because of steeper temperature gradients. However, with longer modulator zones (described below) and better controlled heating and temperature gradients, narrower reinjection bands are expected to be possible at higher temperatures. A reinjection band can be defined as the sample reinjected into the secondary oven 12b after it goes through the modulator 12a.

In some examples, the detector 18 is a mass spectrometer, such as, for example, a time-of-flight mass spectrometer.

FIG. 2 is a block diagram of an exemplary modulator-secondary oven assembly 12. The modulator-secondary oven 12 can includes a modulator portion 12a connected to a secondary oven portion 12b. The modulator portion 12a is connected to the first heated transfer line 20. The secondary oven portion 12b is connected to the second heated transfer line 22. In some instances, the design of the secondary oven portion 12b may include a cylindrical shape and may be, for example, a cylindrical ceramic heater into which the capillary GC column is wound. In other examples, the secondary oven portion 12b may include other shapes, such as, but not limited to a square shape or a rectangular shape. In some instances (not shown), the modulator 12a may be located within the secondary oven 12b.

The exemplary modulator-secondary oven 12 of FIG. 2 may be an integrated design such that the capillary GC column 28 (shown in FIG. 3A) is readily installed and that the path for the sample transition from the modulator portion 12a to the secondary oven portion 12b is integral to the assembly to facilitate a narrow reinjection band. Considerations for the design of the exemplary modulator-secondary oven 12 of FIG. 2 include, but are not limited to: (1) the temperature transitions (e.g., uniform temperature, no hot or cold spots) to and from the first and second transfer lines 20, 22, (2) uniform temperature transition from the modulator portion 12a to the secondary oven portion 12b, (3) temperature gradient of hot-to-cold in going from the modulator portion 12a to the secondary oven portion 12b to maintain the narrow reinjection band, (4) minimal capillary GC column connections, and (5) minimal steps and manipulations of the capillary GC column for installation. In some implementations, for capillary GC column 28 installation, the steps may include: (1) disposing the capillary GC column 28 in the second transfer line 22 of the mass spectrometer 18, (2) winding the capillary GC column 28 into the secondary oven portion 12b, (3) sliding the capillary GC column 28 through the modulator portion 12a or laying the capillary GC column 28 into the modulator portion 12a, (4) sliding the capillary GC column 28 through the first transfer line 20 to the GC 14, (5) closing a cover (see, e.g., 30 in FIGS. 3B, 4A, 4B) on the exemplary modulator-secondary oven 12, and (6) connecting a primary column (not shown) and a secondary column in the GC oven 14. The primary column is included in the GC oven 14 and the secondary column connects to the primary column in the GC oven and extends through the modulator-secondary oven 12 and the detector 18. The primary and secondary columns form the capillary GC column 28.

Figure 3A:
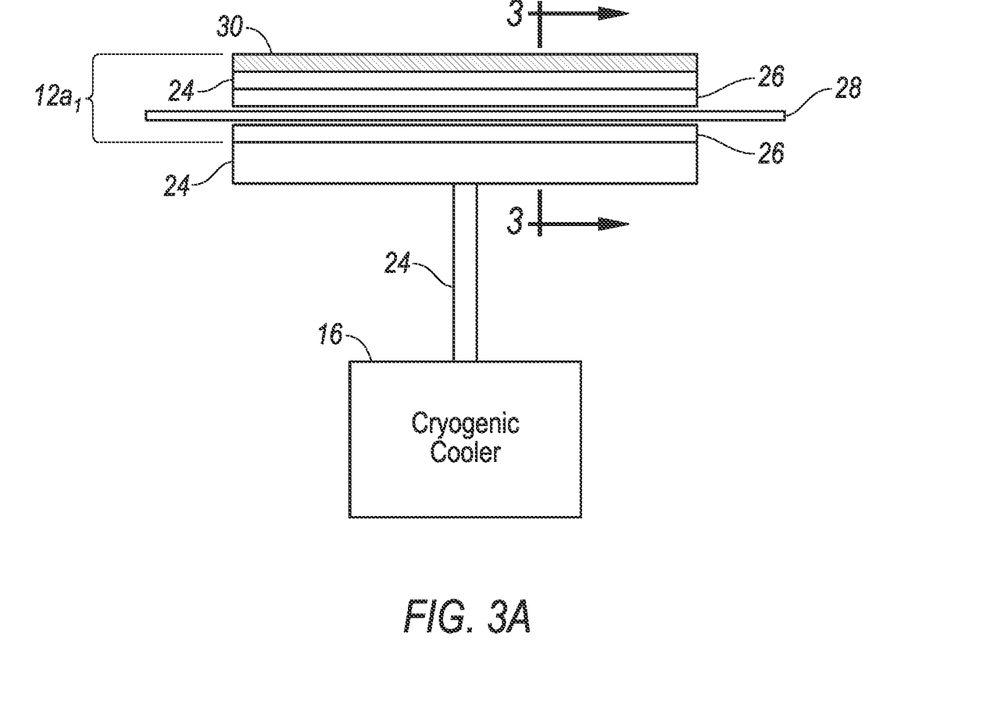
FIG. 3A is a side view of an exemplary modulator portion of the modulator-secondary oven of the gas chromatography system of FIG. 1 connected to a cooler of the gas chromatography system of FIG. 1.
Figure 4A:
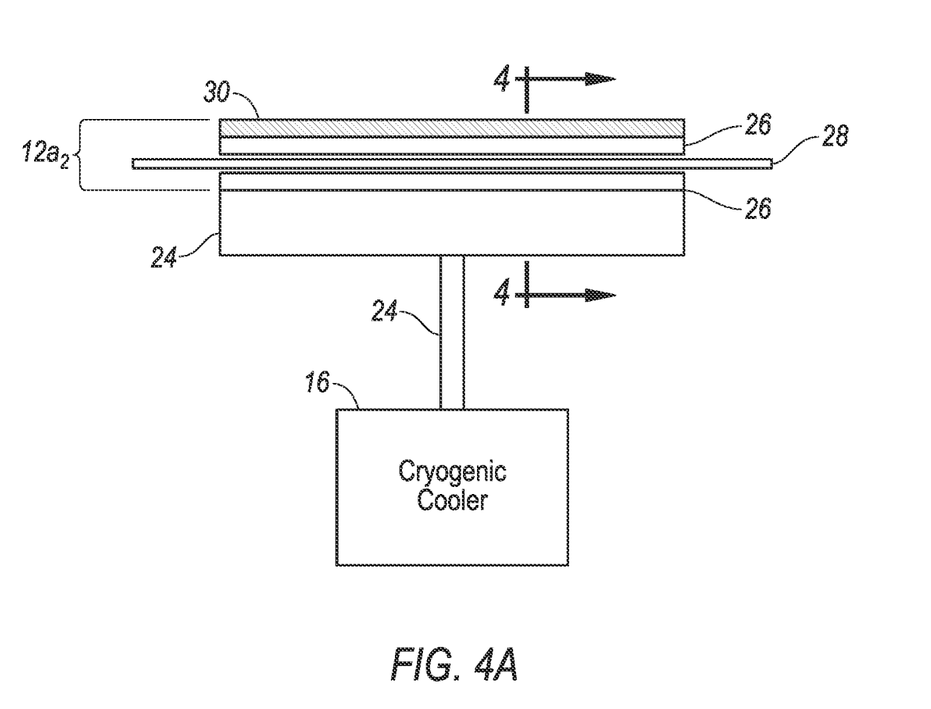
FIG. 4A is a side view of an exemplary modulator portion of the modulator-secondary oven of the gas chromatography system of FIG. 1 connected to a cooler of the gas chromatography system of FIG. 1.
Figure 5A:
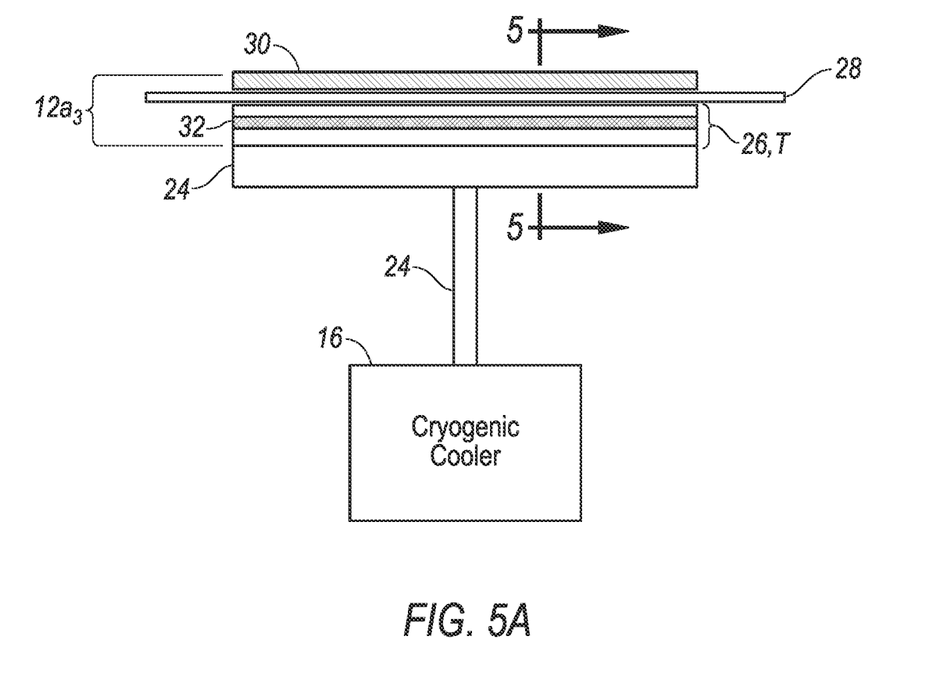
FIG. 5A is a side view of an exemplary modulator portion of the modulator-secondary oven of the gas chromatography system of FIG. 1 connected to a cooler of the gas chromatography system of FIG. 1.

FIGS. 3A, 4A, and 5A illustrate exemplary modulator portions $12a_1$, $12a_2$, $12a_3$ connected to the heat pipe or the thermosiphon system 24. Each of the exemplary modulator portions $12a_1$, $12a_2$, $12a_3$ include: (1) a heater 26 (e.g., a ceramic heater, or any fast heating, low thermal mass heater) in direct contact with the heat pipe or the thermosiphon system 24 for cooling the heater 26 and capillary GC column 28 and (2) the capillary GC column 28 column 28 in direct contact with the heater 26. In other words, the heater 26 defines a void that houses the capillary GC column 28. The attachment of the heater 26 to the cooling source, i.e., the heat pipe or the thermosiphon system 24 provides good thermal conduction to the capillary GC column 28 (which transfers the sample).

Insulation 30 may be disposed upon one or both of the modulation portion 12a of the heat pipe or the thermosiphon system 24 (FIG. 3A) and the heater 26 (FIG. 4A), which may facilitate a reduction or elimination of condensation of frost thereon. In some examples, the insulation 30 may be a layered type of insulation material used in cryogenics. In other examples, the insulation 30 may be a vacuum insulated covering or container.

Figure 3B:
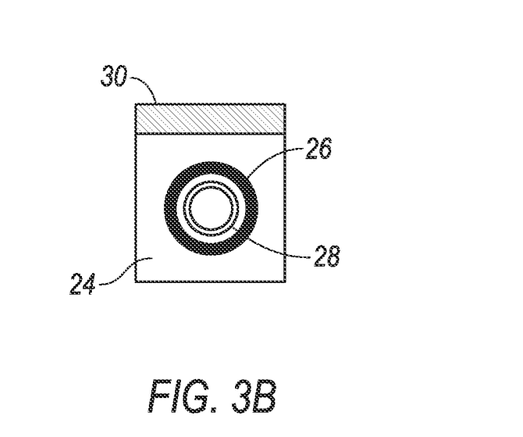
FIG. 3B is a cross-sectional view of the modulator portion according to line 3-3 of FIG. 3A.

Referring to FIGS. 3A and 3B, in some examples, the heat pipe or the thermosiphon system 24 may define a hole that is configured to receive the heater 26. In addition, as previously described, the heater 26 may define a void for housing the capillary CG column 28. As shown, the insulation 30 is disposed about the heat pipe or the thermosiphon system 24 within the modulation portion 12a.

Figure 4B:
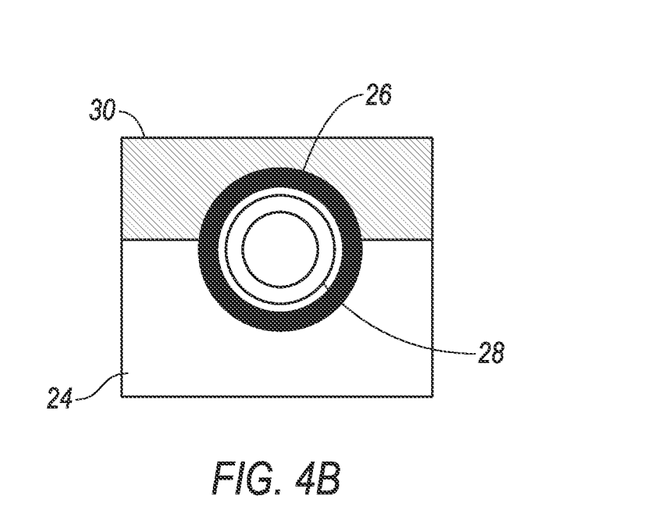
FIG. 4B is a cross-sectional view of the modulator portion according to line 4-4 of FIG. 4A.

Referring to FIGS. 4A and 4B, in some examples, the heat pipe or the thermosiphon system 24 define a semi-circular shape having an open portion configured to receive the heater 26. Similar to FIGS. 3A and 3B, the heater 26 defines a void for housing the capillary GC column 28. In such implementation, the insulation 30 may be disposed over the heater 26 to thereby form a semi-circular shape that is complementary to the semi-circular shape of the heat pipe or the thermosiphon system 24.

Figure 5B:
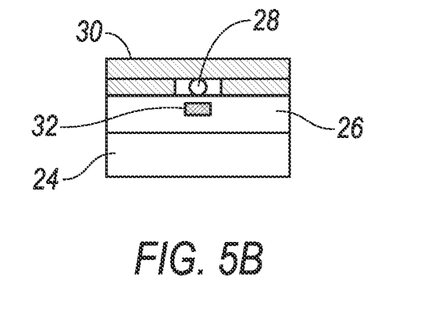
FIG. 5B is a cross-sectional view of the modulator portion according to line 5-5 of FIG. 5A.
Figure 5C:
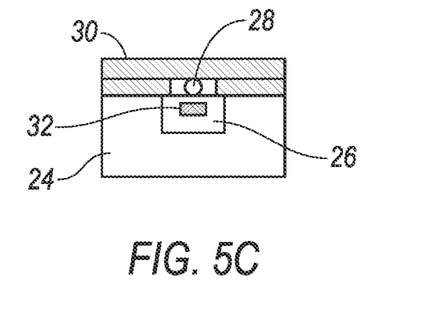
FIG. 5C is a cross-sectional view of the modulator portion according to line 5-5 of FIG. 5A.

Referring to FIGS. 5A, 5B, and 5CB, in some implementation, a heating element 32 may be positioned within or on the surface of the heater 26. For example, the heater 26 may define a thickness T having a surface in contact with the capillary column 28. The heating element 32, may be positioned anywhere within the thickness T or on the surface of the heater 26. Referring to FIG. 5B, the heat pipe or the thermosiphon system 24 may have a flat surface on which the heater 26 is closely attached to the heat pipe or the thermosiphon system 24, while in FIG. 5C, the heat pipe or the thermosiphon system 24 has a U-shape, which also allows for a closely attached surface between the heater 26 and the heat pipe or the thermosiphon system 24

Referring back to FIGS. 3A, 4A, and 5A, in some instances, the heater 26 of the exemplary modulator portions $12a_1$, $12a_2$, $12a_3$ may include a good thermal conducting material (e.g., aluminum nitride). Furthermore, the heater 26 may include a fast responding temperature sensor (not shown). In other examples, the heater 26 is arranged close to the surface of the capillary column 28 or even on the surface of the capillary column 28 in a substantially similar manner as thick film heaters. The heater 26 may include at least two stages (in a substantially similar manner as two-stage thermal modulators) or multiple heater zones for complex heating sequences as discussed in greater detail below. The heater 26 may also be defined by varying watt densities along its (axial to column) length and/or varying thickness of substrate separating the heater 26 from the capillary column 28 to create temperature gradients to focus the reinjection bands. In most instances, the exemplary modulator portions $12a_1$, $12a_2$, $12a_3$ may have two stages or pseudo two stages to separate the reinjection band from the incoming primary column effluent. A stage is a portion or section of the modulator 12a which is configured to trap and reinject a sample. In a two stage modulator 12a, the sample is trapped from the primary column of the first transfer line 20 in the first stage and then reinjected to the second stage where the sample is trapped and reinjected into the column in the secondary-oven 12b. The purpose of two stages is to separate the sample band cleanly from the sample that is flowing continuously from the primary column of the first transfer line 20. The first stage holds the sample while the second stage reinjects the portion trapped in the previous modulation. Heater zones (described below with respect to FIGS. 6-8) are separately controlled, adjacent, contiguous portions on a single heater structure 26. These zones are then controlled in some fashion that is either a one stage or two stage modulator 12a, or a pseudo two stage when operated as a pseudo heat wave.

Figure 6:
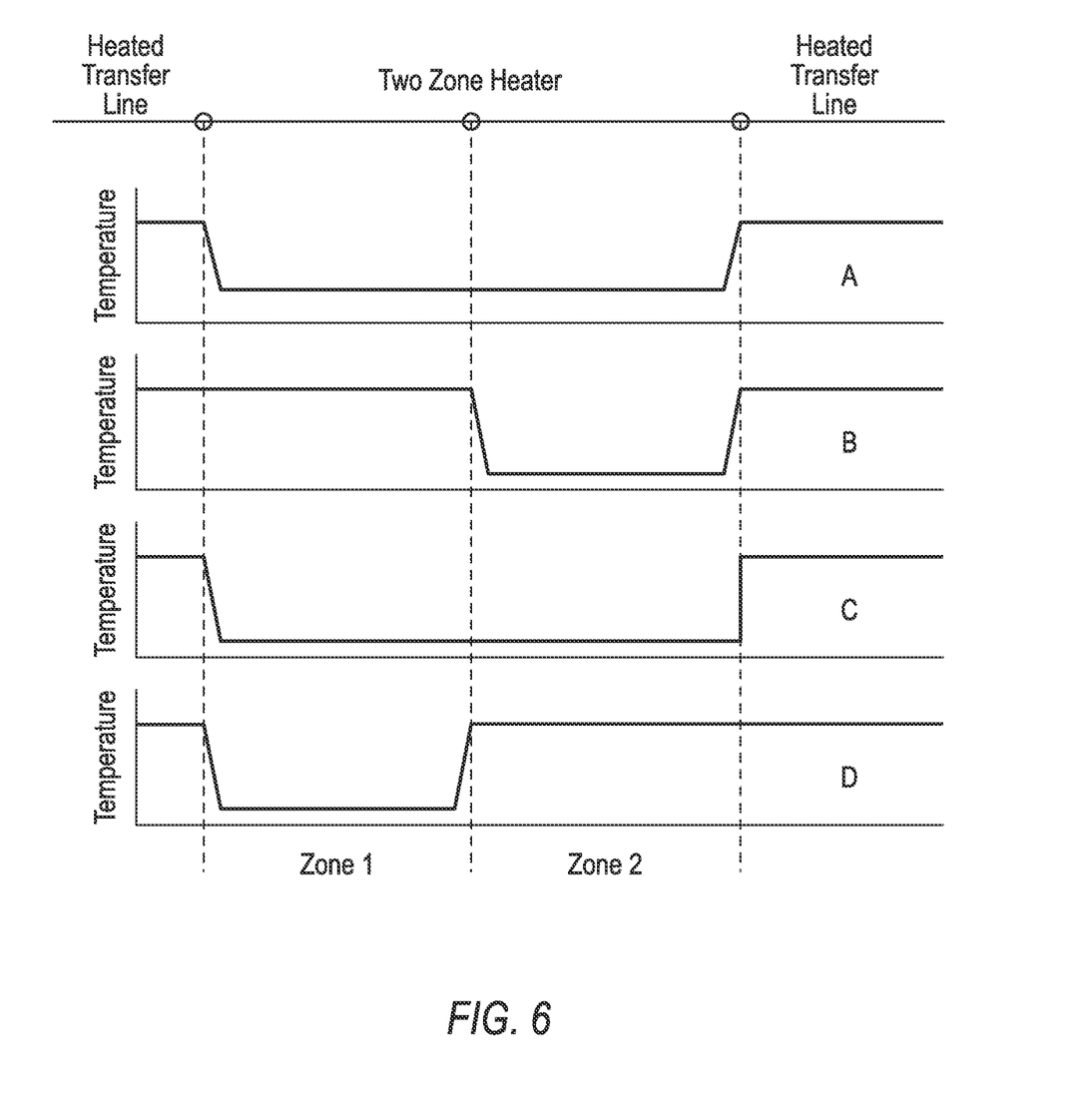
FIG. 6 is a view of an exemplary heating sequence of a two-zone heater of an exemplary modulator portion of the modulator-secondary oven of the gas chromatography system of FIG. 1.
Figure 7:
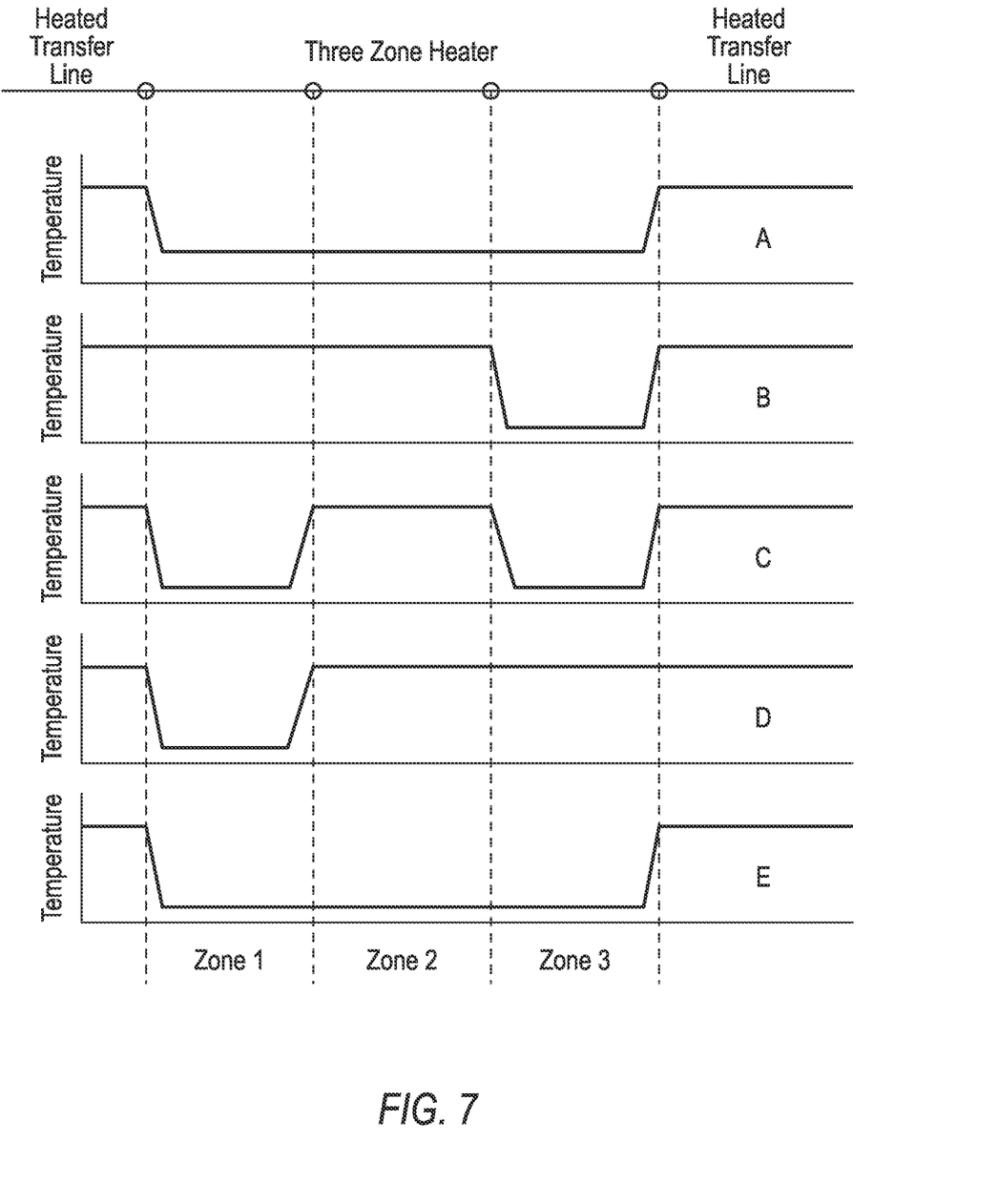
FIG. 7 is a view of an exemplary heating sequence of a three-zone heater of an exemplary modulator portion of the modulator-secondary oven of the gas chromatography system of FIG. 1.
Figure 8:
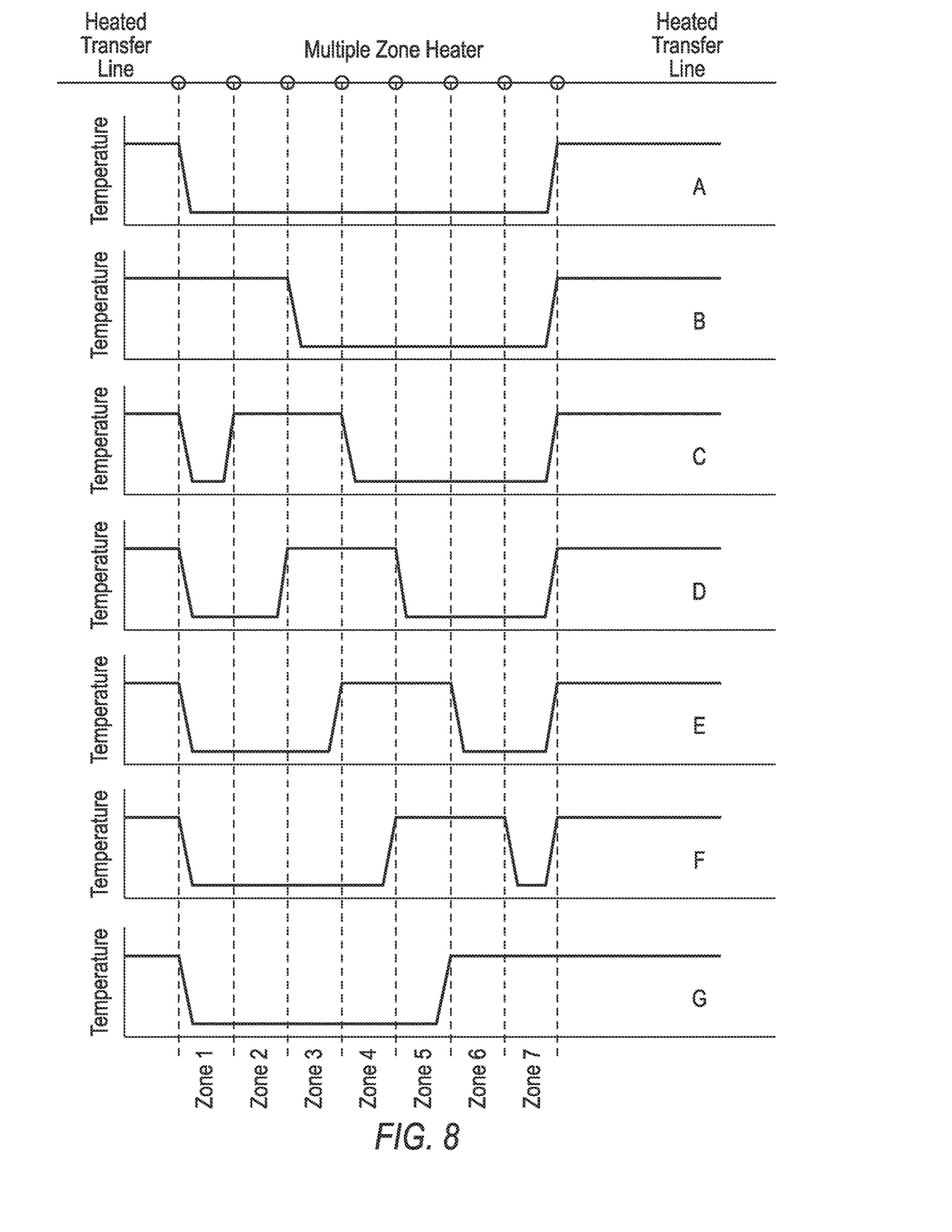
FIG. 8 is a view of an exemplary heating sequence of a seven-zone heater of an exemplary modulator portion of the modulator-secondary oven of the gas chromatography system of FIG. 1.

Referring to FIGS. 6, 7 and 8, exemplary individual heating zones along the length of the modulator portion 12a along a heater 26 are shown in order to illustrate exemplary heating sequences. In most instances, the cooling is in direct contact with the heater 26, and, the capillary column 28 is: (1) in contact with heater 26 (e.g., a ceramic heater, or any fast heating, low thermal mass heater) or (2) near the heater 26. The heating and cooling should be fast enough to achieve a minimum modulation period of approximately 1 second, while a minimum modulation period of approximately 0.5 seconds may be desirable. Some considerations that may be taken into account when designing the heater 26 may include, but are not limited to: (1) the length of each zone, (2) the number of zones, (3) the speed of heating and cooling of the heater 26, and, thus, the capillary column 28, (4) the placement of a heating element 32 (see, e.g., FIGS. 5B, 5C) within or on the surface of the ceramic substrate of the heater 26, (5) varying watt density within a zone or from zone-to-zone, (6) varying substrate thickness between the heating element 32 and the column, (7) varying substrate thickness between the heating element 32 and the cooling source, (8) the thermal effect of the leads connected to the heating element 32 (which may be a source of cold spots), and (9) timing of the heating sequence of the zones. For example, at cryogenic trapping temperatures (e.g., 150 to 200 deg C. below the elution temperature of an analyte), the length of the heating zone(s) may be between one millimeter and ten millimeters. At temperatures higher than cryogenic trapping temperatures, the length of the heating zone(s) may be between one centimeter and ten centimeters. At temperatures lower than cryogenic trapping temperatures, the length of the heating zone(s) may be less than one centimeter.

Referring to FIG. 6, an exemplary heating sequence of a two-zone heater 26 along the length of the modulator portion 12a is shown and will now be described. For clarity, the term cooling as used in the description can mean an active cooling or it may mean a reduction/withdrawal of heat such that such reduction/withdrawal of heat has a net cooling effect.

In some instances, the exemplary configuration illustrated in FIG. 6 may be analogous to a two-stage, quad-jet modulator. Initially as shown in step A, both zones of the heater 26 are cooled and the sample coming from the primary column of the GC 14 is trapped at the entrance to the modulator portion 12a. At step B, the first zone is heated to move the sample from the first zone to the second zone and then, at step C, the first zone is cooled to stop the sample coming from the primary column. Finally, at step D, the second zone is heated to reinject the sample into the secondary column and then the modulator portion 12a returns to the initial state by turning off the second zone (i.e., by cooling the second zone). Depending on many parameters (e.g., temperature gradients between zones, speed of heating and cooling, speed of modulation, flow velocity, analyte volatility), the exemplary configuration associated with the exemplary heating sequence of a two-zone heater 26 may or may not work well. Expected challenges may include moving the sample completely from the first stage to the second stage while also making a clean cut of the sample from the primary column effluent and then reinjecting a sharp band from the second stage while not having any tailing from slower moving sample caught between the stages. Accordingly, the exemplary heating sequence of a two-zone heater 26 may likely require specially designed temperature gradients controlled by substrate thickness and heater watt densities axially along the capillary column 28.

Referring to FIG. 7, an exemplary heating sequence of a three-zone heater 26 is shown; in some instances, this exemplary configuration may provide a possible solution to ill-defined temperature regions between zones 1 and 2 of the above-described two-zone heater configuration of FIG. 6. However, a design configuration including a three-zone heater 26 may still suffer from an ill-defined temperature zone between the first and second zones; although this may be controlled by timing, the control may depend on: (1) the temperature gradients between zones, (2) how quickly the system heats and cools, (3) flow velocity, and (4) the volatility of analytes. As shown, the heating sequence defines three zones along the length of the modulator portion 12a. At step A, initially, the three zones of the heater 26 are cooled and the sample coming from the primary column is trapped at the entrance to the modulator portion 12a. At step B, the first and second zones are heated to move the sample from the first zone to the second zone. At step C, the first zone is cooled to stop the sample coming from the primary column. At step D, the third zone is heated to reinject the sample into the secondary column, and then at step E, the second and third zones are cooled, which results in the modulator portion 12a returning to the initial state.

Referring to FIG. 8, an exemplary heating sequence for a multiple (e.g., seven) zone heater 26 is shown. Although a seven zone heater is shown in FIG. 8, the number of zones can vary depending on the properties of the heating and cooling. In a configuration including a multiple-zone heater 26, the heating sequence is a pseudo heat wave that moves from the entrance of the modulator portion 12a to the exit of the modulator portion 12a in a substantially similar manner as that in a mechanical modulator, which may be a "sweeper" having a heated arm that rotates over the column, moving the trapped sample along the column in front of the hot arm. As shown, the heating sequence defines seven zones along the length of the modulator portion 12a. At step A, initially, the seven zones of the heater 26 are cooled and the sample coming from the primary column (not shown) is trapped in the at the entrance to the modulator portion 12a. At step B, the first and second zones are heated to move the sample from the first zone to the third zone. At step C, the first zone is cooled to stop the sample coming from the primary column and the third zone is heated to move the sample to the fourth zone. At step D, the second zone is cooled and the fourth zone heated to move the sample to the fifth zone. At step E, the third zone is cooled and the fifth zone is heated to move the sample to the sixth zone. At step F, the fourth zone is cooled and sixth zone is heated to move the sample to the seventh zone. Finally, at step G, the fifth zone is cooled and the seventh zone is heated to reinject the sample into a portion of the column 28 located in the secondary oven 12 (i.e., a portion of the secondary column), and then the sixth and seventh zones are cooled, which results in the modulator portion 12a returning to the initial state.

As seen in FIG. 8, two zones are heated at a time, and, the two zones heated move one zone at a time. Heating two zones at a time may be better than heating one zone at a time because the area of the temperature gradient between zones should be heated better while moving from zone-to-zone. Depending on: (1) the heating and cooling properties, (2) the length of the zones, (3) the period of the modulation, (4) the flow velocity, and (5) the volatility of analytes, more zones may better separate the reinjection sample from the trapped sample of the primary column. The timing may be important for focusing and separating the reinjection band from the effluent of the primary column. The "heat wave" must not travel faster than the sample transport through the capillary column 28 within the modulator portion 12a. If the heating is sufficiently high that the sample is essentially unretained, the sample may travel at the velocity of the carrier gas. The "heat wave" must move more slowly than the velocity of the carrier gas. The slower the "heat wave" moves, the more the sample is moved from the temperature gradient zone and the better the separation of the reinjection zone is from the primary column effluent. However, if the "heat wave" moves too slowly, the modulation period may be longer than the minimum required modulation period. Also, if the "heat wave" moves too slowly the sample may breakthrough the cold zone behind the "heat wave".

By having multiple zones, it is expected that the "heat wave" can move quickly and better separate the reinjection band from the trapped primary column effluent. This should reduce or eliminate peak tailing in the reinjection band. To adjust for different modulation periods, the final step could be a hold. Also, the steeper the temperature gradient between a heated and cooled zone, the better the focusing of the reinjection band. Steeper gradients should be achieved by lower temperatures.

A closer examination of conditions for modulation includes typical flow velocities and how fast the sample moves through the modulator portion 12a when heated sufficiently to be unretained. For typical column diameters and column lengths, the flow velocity may be approximately 100 cm/sec to approximately 400 cm/sec (or approximately 0.1 cm/ms to approximately 0.4 cm/ms) in the modulator portion 12a. It is probably not possible to heat fast enough to move the wave faster than this velocity if the length of a heater zone is 1 cm. This means the speed of the "heat wave" is limited by how fast the heating is. If the heater is 10 zones, a 0.5 second modulation period divided by 10 zones is 0.05 seconds per zone. This would require heating at least 150 degrees Celsius in this time period or 3000 degrees per second. This may not be possible. Heating at least 150 degrees Celsius above the trapping temperature is typically considered the rise in temperature needed to remobilize (reinject) a sample when the sample is trapped at a sufficiently low temperature. Conversely, the modulator 12a needs to be cooled about 150 degrees Celsius below the temperature at which the sample (analyte) elutes from the primary column in the GC oven 14. Then for reinjection, the temperature of the modulator 12a needs to be raised to about 150 degrees Celsius. So ideally, the temperature differential between the modulator trapping temperature and the GC oven temperature is controlled to be at or around 150 degrees Celsius as the GC oven 14 temperature rises. For example analyte A elutes from the primary column in the GC oven 14 at 50 degrees Celsius, so the modulator 12a may trap it at ~−100 degrees Celsius (150° C. lower) and then reinject it at about 50 degrees Celsius. While analyte B elutes later from the primary column in the GC oven 14 at 300 degrees Celsius, so the modulator 12a traps it at 150 degrees Celsius (150 degrees Celsius lower) and reinjects it at 300 degrees Celsius. Note that these are approximate numbers.

One ceramic heater manufacturer claims a heating rate of approximately 1,400 degrees per second. If 1,500 degrees per second is achievable, then the time to heat 150° is 0.1 seconds. For a 0.5 second modulation period, only five zones would be possible. For a 1 second modulation period, 10 zones would be possible. For the sequence in FIG. 8, seven zones would work for a 0.6 second modulation period because the first step heats two zones. A 1.0 second modulation period would be sufficient for a column set with a 30 m×0.25 mm primary column and helium carrier gas. As far as speed of heating, the smaller the heater (and each zone), the faster the heating. If a smaller heater is needed for heating speed, a lower trapping temperature may be needed because the lower the temperature, the better the trapping and the shorter the length of each heater zone that is required.

Other parameters to consider are the trapping temperature (i.e., the temperature at which the movement of the sample through the modulator is significantly slowed or essentially stopped) and breakthrough (i.e., the sample moving through the modulator and out of the modulator during the trapping step because of insufficient trapping). These parameters determine (i) how fast the heat wave has to move before the sample breaks through and (ii) the maximum modulation period. The heat wave should stay ahead of, or move faster than, the trapped sample. This speed along with the length of each zone and how many zones may limit how long the modulation period can be. Unless the trapping temperature is extremely cold (e.g., less than −150 degrees Celsius), the sample may have some measurable movement through the trapping zone over a length of time of a typical modulation period, and the speed of movement may depend on the trapping temperature. The higher the trapping temperature, the faster the trapped sample moves. Either each zone must be longer, or, the number of zones must be greater, or, a combination of the two. The length of the trapping zone may determine how long the sample can be held before breaking through and exiting the trapping zone. A longer modulator (trapping zone) may be required for higher trapping temperatures.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for applying a heating sequence for a modulator, the method comprising:

during a first period of time, heating a first heating zone of a plurality of heating zones disposed along a length of the modulator without heating a second zone of the plurality of heating zones to cause a sample trapped from a first transfer line at an entrance of the modulator to move from the first heating zone to the second heating zone;

during a second period of time following the first period of time, withdrawing the heating of the first heating zone to prevent the sample from entering the modulator from the first transfer line; and during a third period of time following the second period of time, heating the second heating zone of the plurality of heating zones without heating the first heating zone to reinject the sample into a second transfer line.

2. The method of claim 1, further comprising, during a fourth period of time following the third period of time, operating the modulator during an initial state by not heating any of the plurality of heating zones in order to trap the sample from the first transfer line at the entrance of the modulator.

3. The method of claim 2, wherein operating the modulator during the initial state by not heating any of the plurality of heating zones comprises actively cooling the plurality of heating zones.

4. The method of claim 3, wherein actively cooling the plurality of heating zones comprises actively cooling the plurality of heating zones via a heat pipe connecting the modulator to a cooler.

5. The method of claim 3, wherein actively cooling the plurality of heating zones comprises actively cooling the plurality of heating zones via a thermosiphon system connecting the modulator to a cooler.

6. The method of claim 2, wherein operating the modulator during the initial state by not actively heating any of the plurality of heating zones comprises withdrawing any heating of the plurality of heating zones to have a net cooling effect.

7. The method of claim 1, wherein the first transfer line connects the modulator to a chromatograph.

8. The method of claim 7 wherein the chromatograph comprises a gas chromatograph.

9. The method of claim 1, wherein the second transfer line connects the modulator to a detector.

10. The method of claim 1, wherein:
heating the first heating zone during the first time period further comprises heating a third heating zone disposed between the first heating zone and the second heating zone;
withdrawing the heating of the first heating zone during the second time period further comprises withdrawing the heating of the first heating zone while continuing the heating of the third heating zone; and
heating the second heating zone during the third time period further comprises continuing the heating of the third heating zone.

11. The method of claim 1, wherein the modulator comprises:
a heater defining a void; and
a capillary column arranged in the void of the heater.

12. The method of claim 11, wherein the heater is disposed on a surface of the capillary column.

13. The method of claim 11, wherein the heater:
defines a heater thickness having a surface disposed on the capillary column; and
comprises a heating element disposed on the surface of the heater.

14. The method of claim 11, wherein the heater:
defines a heater thickness having a surface disposed on the capillary column; and
comprises a heating element disposed within a threshold distance from the surface of the heater.

15. The method of claim 11, wherein the capillary column is in direct contact with the heater.

* * * * *